(12) United States Patent  (10) Patent No.: US 9,830,114 B2
Nara                      (45) Date of Patent: Nov. 28, 2017

(54) IMAGE PROCESSING APPARATUS AND COMPUTER READABLE MEDIUM AND METHOD THEREOF

(75) Inventor: Noriaki Nara, Ebina (JP)

(73) Assignee: FUJI XEROX CO., LTD., Tokyo (JP)

( * ) Notice: Subject to any disclaimer, the term of this patent is extended or adjusted under 35 U.S.C. 154(b) by 1360 days.

(21) Appl. No.: 12/625,971

(22) Filed: Nov. 25, 2009

(65) Prior Publication Data

US 2010/0245864 A1 Sep. 30, 2010

(30) Foreign Application Priority Data

Mar. 26, 2009 (JP) .................................. 2009-075976

(51) Int. Cl.
G06F 3/12 (2006.01)
H04N 1/58 (2006.01)

(52) U.S. Cl.
CPC .......... G06F 3/1208 (2013.01); G06F 3/1256 (2013.01); H04N 1/58 (2013.01)

(58) Field of Classification Search
None
See application file for complete search history.

(56) References Cited

U.S. PATENT DOCUMENTS

| 4,584,573 | A  | * | 4/1986  | Ito .............................. 400/124.02 |
| 6,067,555 | A  |   | 5/2000  | Hayashi |
| 6,545,771 | B1 | * | 4/2003  | Sakai et al. ..................... 358/1.9 |
| 6,816,268 | B1 | * | 11/2004 | Suzuki ......................... 358/1.11 |
| 8,208,179 | B2 | * | 6/2012  | Ishikawa et al. ............ 358/3.28 |
| 2003/0047099 | A1 | * | 3/2003 | Hanyu ........................... 101/484 |
| 2004/0139400 | A1 | * | 7/2004 | Allam et al. ................... 715/526 |
| 2006/0215219 | A1 | * | 9/2006 | Yorimoto et al. ........... 358/1.15 |
| 2006/0224559 | A1 | * | 10/2006 | Abiko .............................. 707/1 |
| 2007/0091350 | A1 | * | 4/2007 | Aritomi et al. .............. 358/1.14 |
| 2007/0133027 | A1 | * | 6/2007 | Salgado et al. .............. 358/1.13 |
| 2008/0094517 | A1 | * | 4/2008 | Takeuchi et al. ............. 348/649 |
| 2009/0059300 | A1 | * | 3/2009 | Torisaki et al. .............. 358/1.18 |
| 2009/0180164 | A1 | * | 7/2009 | Miyagi ......................... 358/518 |

FOREIGN PATENT DOCUMENTS

| JP | 07-287767 A | 10/1995 |
| JP | 09-046531 A | 2/1997 |
| JP | 2002-321403 A | 11/2002 |
| JP | 2007-301857 A | 11/2007 |

OTHER PUBLICATIONS

Japanese Office Action dated Feb. 19, 2013 issued in corresponding Japanese Application No. 2009-075976.

* cited by examiner

*Primary Examiner* — John Wallace
(74) *Attorney, Agent, or Firm* — Sughrue Mion, PLLC (57) ABSTRACT

An image processing apparatus comprises: an acquiring unit that acquires image data representing a document image that includes characters; an extracting unit that extracts, from the document image represented by the image data acquired by the acquiring unit, a character that has undergone a modification for distinguishing from another character; a processing unit that processes the image data by reducing a density of the character other than the extracted character below a density indicated by the acquired image data; and an output unit that outputs the image data processed by the processing unit to an image forming apparatus.

5 Claims, 5 Drawing Sheets

IMAGE PROCESSING APPARATUS AND COMPUTER READABLE MEDIUM AND METHOD THEREOF

CROSS-REFERENCE TO RELATED APPLICATIONS

This application is based on and claims priority under 35 U.S.C. 119 from Japanese Patent Application No. 2009-75976, which was filed on Mar. 26, 2009.

BACKGROUND

Technical Field

The present invention relates to an image processing apparatus and program.

Related Art

In a document presenting a variety of information, ways are devised to highlight important content or content that is meant to draw the viewer's attention, such as changing the color of characters corresponding to this content to a different color (e.g., red) from the color (e.g., black) most used in the document.

SUMMARY

In an aspect of the invention, there is provided an image processing apparatus including: an acquiring unit that acquires image data representing a document image that includes characters; an extracting unit that extracts, from the document image represented by the image data acquired by the acquiring unit, a character that has undergone a modification for distinguishing from another character; a processing unit that processes the image data by reducing a density of the character other than the extracted character below a density indicated by the acquired image data; and an output unit that outputs the image data processed by the processing unit to an image forming apparatus.

BRIEF DESCRIPTION OF THE DRAWINGS

An exemplary embodiment of the present invention will be described in detail based on the following figures, wherein.

DETAILED DESCRIPTION (1) Configuration

Figure 1:
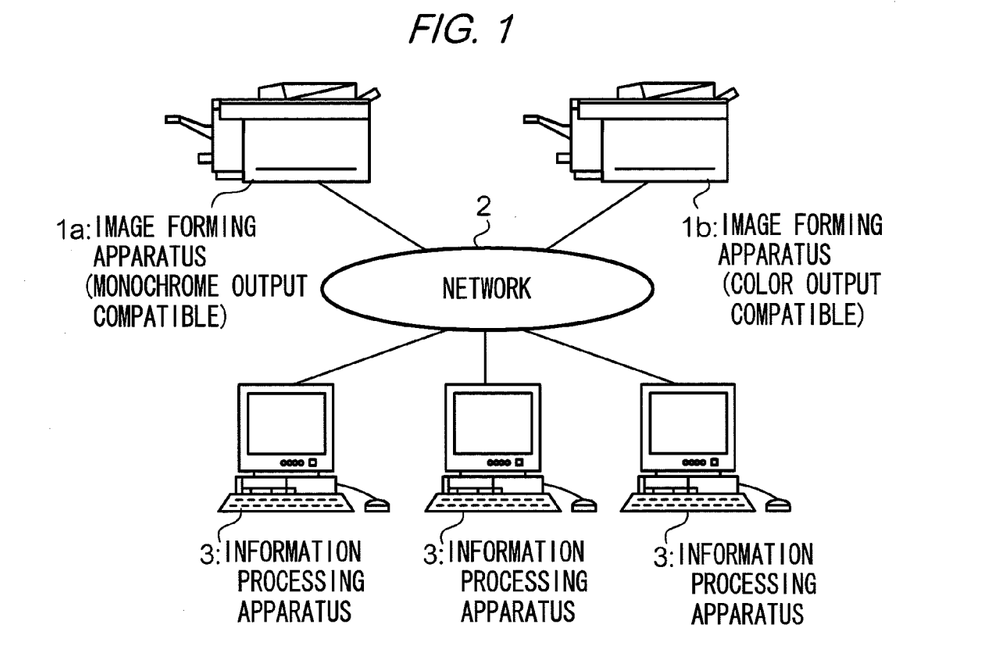
FIG. 1 shows an overall configuration of a system according to an exemplary embodiment of the present invention.

FIG. 1 shows an overall configuration of a system according to the present embodiment. An image forming apparatus 1a, an image forming apparatus 1b and information processing apparatuses 3 are connected to a network 2, which is a communication network for conveying information such as a WAN (Wide Area Network) or a LAN (Local Area Network). The image forming apparatus 1a and the image forming apparatus 1b, which are devices that collect together functions such as copying, printing and scanning, for example, form images on recording paper, read images from recording paper, and the like. The image forming apparatus 1a, which is a model only capable of black and white printing, forms images that are only expressed in shades of the single color black. On the other hand, the image forming apparatus 1b, which is a model capable of color printing, forms multicolored images. In the following description, the image forming apparatus 1a and the image forming apparatus 1b, when not needing to be described separately, will be referred to as image forming apparatus 1, omitting the letter at the end. The information processing apparatuses 3, which are, for example, personal computers, perform various types of image processing, and supply image data to the image forming apparatus 1 via the network 2 and instruct the image forming apparatus 1 to form an image that depends on the image data, for instance. Note that while two image forming apparatuses 1a and 1b and three information processing apparatuses 3 are illustrated in FIG. 1, the number of image forming apparatuses 1 and information processing apparatuses 3 connected to the network 2 is not limited to this.

Figure 2:
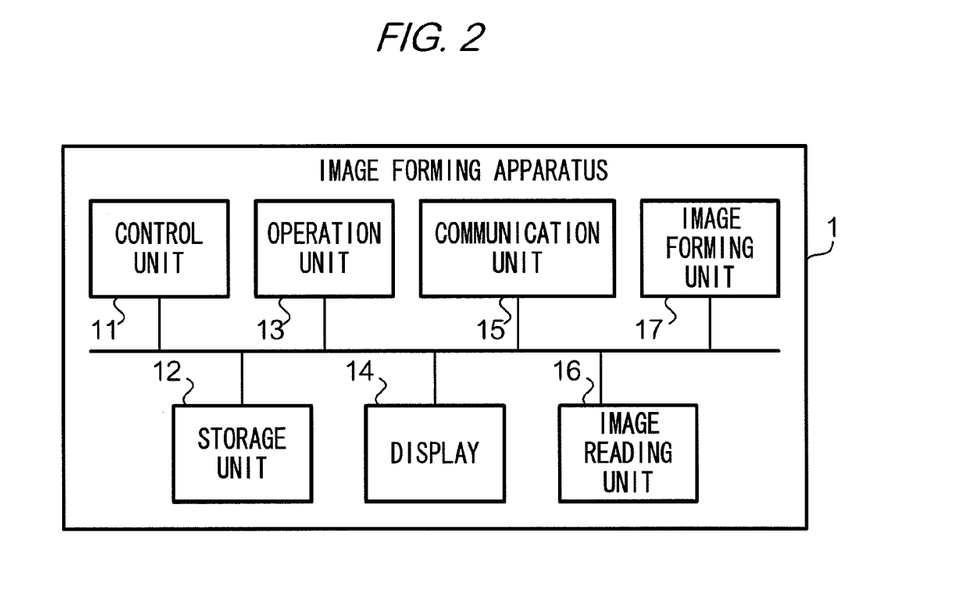
FIG. 2 is a block diagram showing a configuration of an image forming apparatus 1 according to the exemplary embodiment.

FIG. 2 is a block diagram showing a configuration of the image forming apparatus 1. The image forming apparatus 1 is provided with a control unit 11, a storage unit 12, an operation unit 13, a display 14, a communication unit 15, an image reading unit 16, and an image forming unit 17. The control unit 11, which is provided with a CPU (Central Processing Unit), a ROM (Read Only Memory) and a RAM (Random Access Memory), controls the constituent elements of the image forming apparatus 1 as a result of the CPU executing programs stored in the ROM or the storage unit 12. The storage unit 12, which is a nonvolatile secondary storage apparatus such as an HD (Hard Disk), stores various programs and data. The operation unit 13, which is provided with multiple keys, receives operations by a user, and supplies signals that depend on those operations to the control unit 11. The display 14, which is provided with a VRAM (Video RAM), a liquid crystal display and a drive circuit thereof, displays the progress status of processing and information for directing operations by the user based on information supplied from the control unit 11. The communication unit 15, which is provided with a communication circuit and a communication interface, communicates with the information processing apparatuses 3 via the network 2. The image reading unit 16, which is provided with an optical system member constituted by a CCD (Charge Coupled Device), reads an image formed on recording paper using the optical system member, and generates image data representing the read image. The image forming unit 17 is provided with a photosensitive drum, which is an image carrier, an exposure unit that forms an electrostatic latent image, a developing unit that develops the electrostatic latent image to form a toner image, a transfer unit that transfers that toner image to recording paper, and a fixing unit that fixes the toner image transferred to the recording paper onto the recording paper. This image forming unit 17 forms an image on recording paper, according to image data generated by the image reading unit 16 and image data received via the communication unit 15. This image forming unit 17 is an example of an image forming unit that forms an image on recording paper, according to image data received via the communication unit 15.

Figure 3:
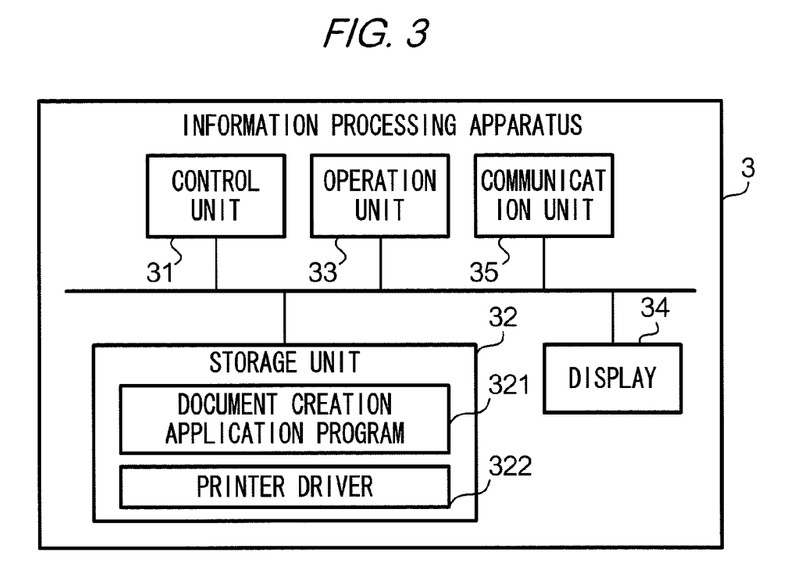
FIG. 3 is a block diagram showing a configuration of an information processing apparatus 3 according to the exemplary embodiment.

FIG. 3 is a block diagram showing a configuration of an information processing apparatus 3.

The information processing apparatus 3 is provided with a control unit 31, a storage unit 32, an operation unit 33, a display 34, and a communication unit 35. The control unit 31, which is provided with a CPU, a ROM and a RAM, controls the constituent elements of the information processing apparatus 3 as a result of the CPU executing programs stored in the ROM or the storage unit 32. The operation unit 33, which is provided with an operation device such as a keyboard or a mouse, receives operations by a user, and supplies signals that depend on those operations to the control unit 31. The display 34 is provided with a display device such as a CRT (Cathode Ray Tube) display or a liquid crystal display. This display 34 displays a variety of information based on image data supplied from the control unit 31. The communication unit 35, which is provided with a communication circuit and a communication interface, communicates with the image forming apparatus 1 via the network 2.

The storage unit 32, which is a nonvolatile secondary storage apparatus such as an HD, stores various programs and data. The programs stored in the storage unit 32 include a document creation application program 321 in which are written procedures for creating, saving and editing document image data representing documents that express characters, graphics, tables and the like in multiple colors, and a printer driver 322 in which is described processing procedures for converting the document image data to image data expressed in a page description language interpretable by the image forming apparatus 1.

The document creation application program 321 is for creating document image data expressed only in monochrome, or in other words, in shades of the single color black. With such monochrome document image data, because a color other than black (e.g., red) cannot be designated to highlight important content or content that is meant to draw attention, for example, ways are devised to catch the viewer's eye by performing a modification (hereinafter, referred to as a character embellishment) on applicable characters for distinguishing those characters from other characters. Hereinafter, underlining character embellishment that involves drawing a line under a character string will be used, in particular, as this character embellishment. In other words, underlining character embellishment is a process of forming a line segment image at or below the bottom edge of a rectangular area that bounds the characters targeted for character embellishment. A command for performing black underlining character embellishment on document image data is written in the document creation application program 321.

Procedures of a process (hereinafter, referred to as highlight support processing) for further visually highlighting, for the viewer, characters that have undergone underlining character embellishment with respect to monochrome document image data created as a result of the user executing the document creation application program 321, are written in the printer driver 322. Also, procedures of a process for specifying a location at which underlining character embellishment has been performed are written in the printer driver 322. Specifically, because the position of a line segment image corresponding to underlining character embellishment is designated by a command written in the document creation application program 321, a command interpretation routine, which is a procedure in which the control unit 31 specifies the position of a line segment image by interpreting the command, and further specifies the position of a character image above the line segment image, is written in the printer driver 322.

The highlight support processing is classified into three processes, namely, "a: converting a character that has undergone underlining character embellishment to a red character", "b: performing shading character embellishment on a character that has undergone underlining character embellishment" and "c: lightening characters other than a character that has undergone underlining character embellishment," and processing modes for implementing processing that combines these processes are described in the printer driver 322. Here, shading character embellishment is a process of disposing multiple images of halftone dots (hereinafter, halftone dot images) at a preset interval, in a rectangular area that includes the bounding rectangle of the character string. Also, lightening involves lowering the density of an image, and, for example, involves reducing the area of toner covering a unit area of the surface of recording paper compared with before lightening is performed. In practice, this lightening is realized by reducing the size of halftone dots formed by toner or reducing the thickness of lines of a line screen formed by toner, on the surface of recording paper.

(2) Operation

The user creates a document by causing an information processing apparatus 3 to execute the document creation application program 321, and operating the operation unit 33 while referring to the display 34. At this time, the user is able to instruct the information processing apparatus 3 to perform underlining character embellishment on characters at a location that he or she wants to highlight in a document, by operating the operation unit 33. The control unit 31 creates document image data representing a document according to operations by the user in a memory such as RAM, in accordance with the procedures written in the document creation application program 321. The control unit 31 is thus an example of an acquiring unit that, by creating and storing document image data, acquires the document image data. Then, when the user instructs the information processing apparatus 3 to print out the created document, by operating the operation unit 33, the control unit 31 executes the printer driver 322 and starts the processing shown in FIG. 4.

Figure 4:
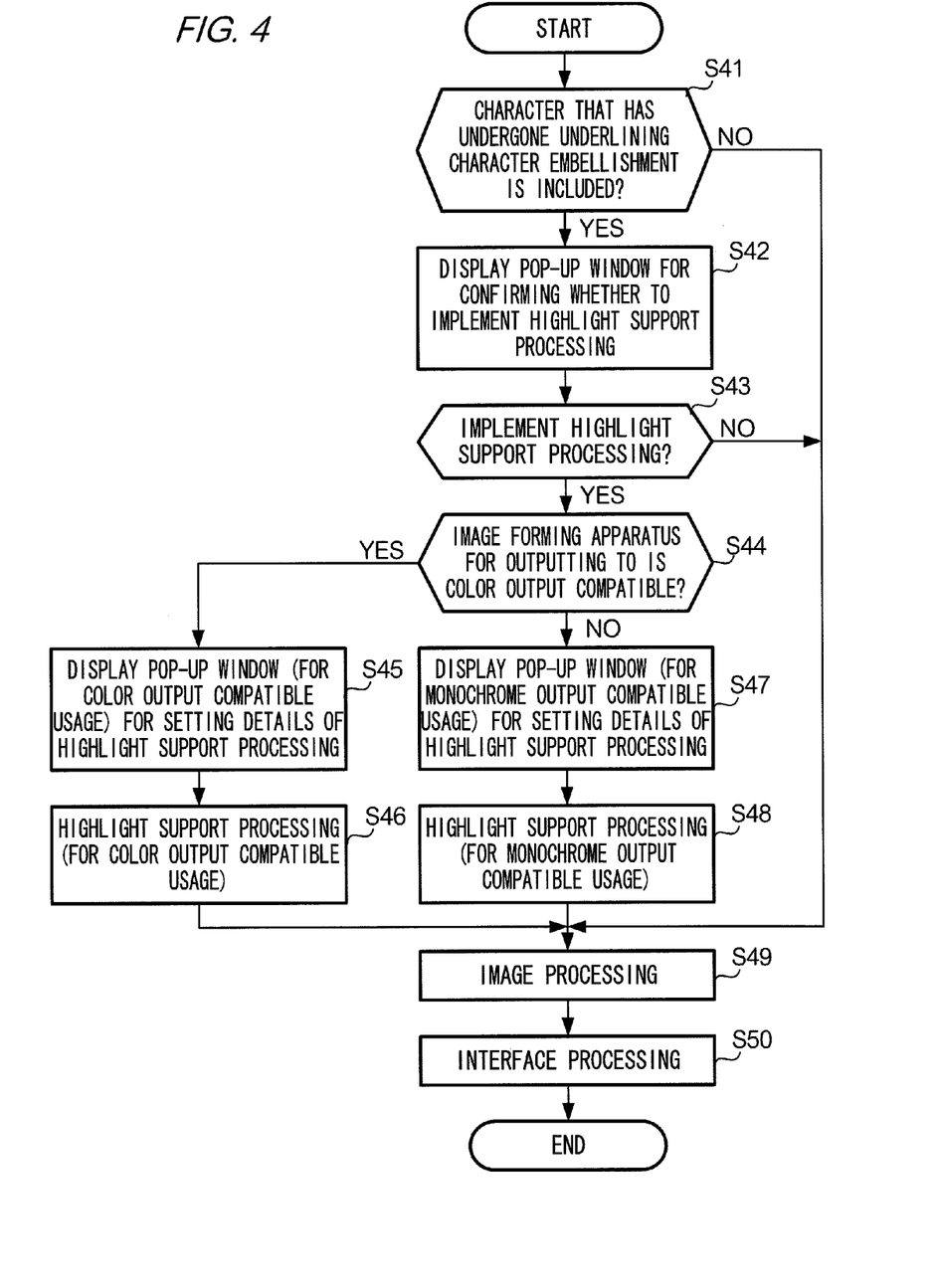
FIG. 4 illustrates highlight support processing according to the exemplary embodiment.

FIG. 4 is a flowchart illustrating an operation of the highlight support processing of the information processing apparatus 3.

Figure 5:
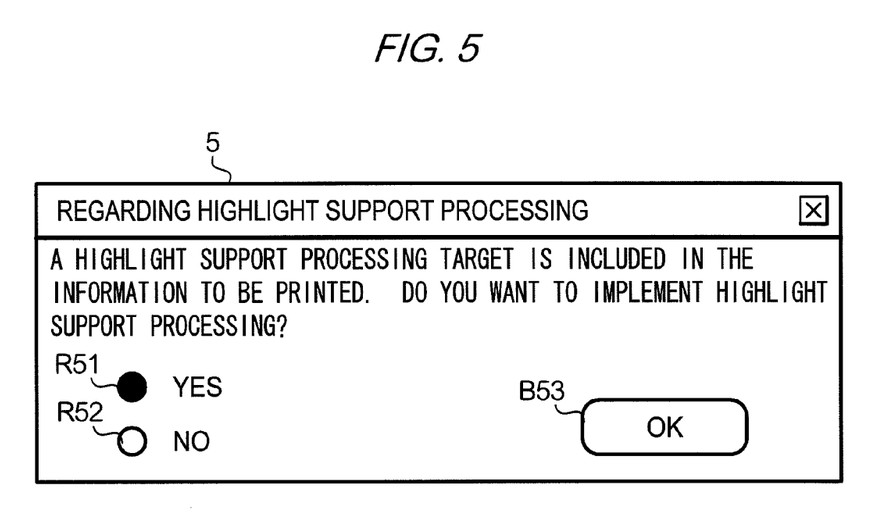
FIG. 5 shows a pop-up window 5 for confirming whether to implement highlight support processing in the exemplary embodiment.

The control unit 31 interprets the document image data, and judges whether a character that has undergone underlining character embellishment and is targeted for highlight support processing is included (step S41). More specifically, the control unit 31 executes the command interpretation routine written in the printer driver 322 to perform command interpretation on the document image data, and extracts a character image above a line segment image corresponding to underlining character embellishment. In other words, the control unit 31 is an example of an extracting unit that extracts a character that has undergone a modification for distinguishing from other characters as an extracted character. Also, the control unit 31, in the case where a character image can be extracted, judges that a character that has undergone underlining character embellishment is included in the document image data. The control unit 31, in the case of judging that a character that has undergone underlining character embellishment is included in the document image data (YES at step S41), displays a pop-up window 5 that allows the user to confirm whether to implement the highlight support processing on the display 34 (step S42).

FIG. 5 shows the pop-up window 5.

Radio buttons R51 and R52, which are options for alternatively selecting whether or not to implement the highlight support processing, are provided on the pop-up window 5, and the user can select one of the radio button R51 or the radio button R52 (step S43). Here, assume that the user selects the radio button R51 inscribed with "Yes", as shown in FIG. 5, and further selects a soft button B53 inscribed with "OK" in a right edge corner portion of this window, by operating the operation unit 33 (YES at step S43). Then, the control unit 31 judges whether the image forming apparatus 1 targeted to be instructed to form an image is compatible with forming a color image (step S44). Property information managing various settings and attributes of the image forming apparatus 1 is stored in a storage area of the storage unit 32 corresponding to the printer driver 322. The control unit 31 may judge whether the image forming apparatus 1 is compatible with forming a color image by referring to this property information. Hereinafter, compatibility with forming a color image will be referred to as color output compatible, and compatibility with only forming a monochrome image and not with forming a color image will be referred to as monochrome output compatible.

Figure 6:
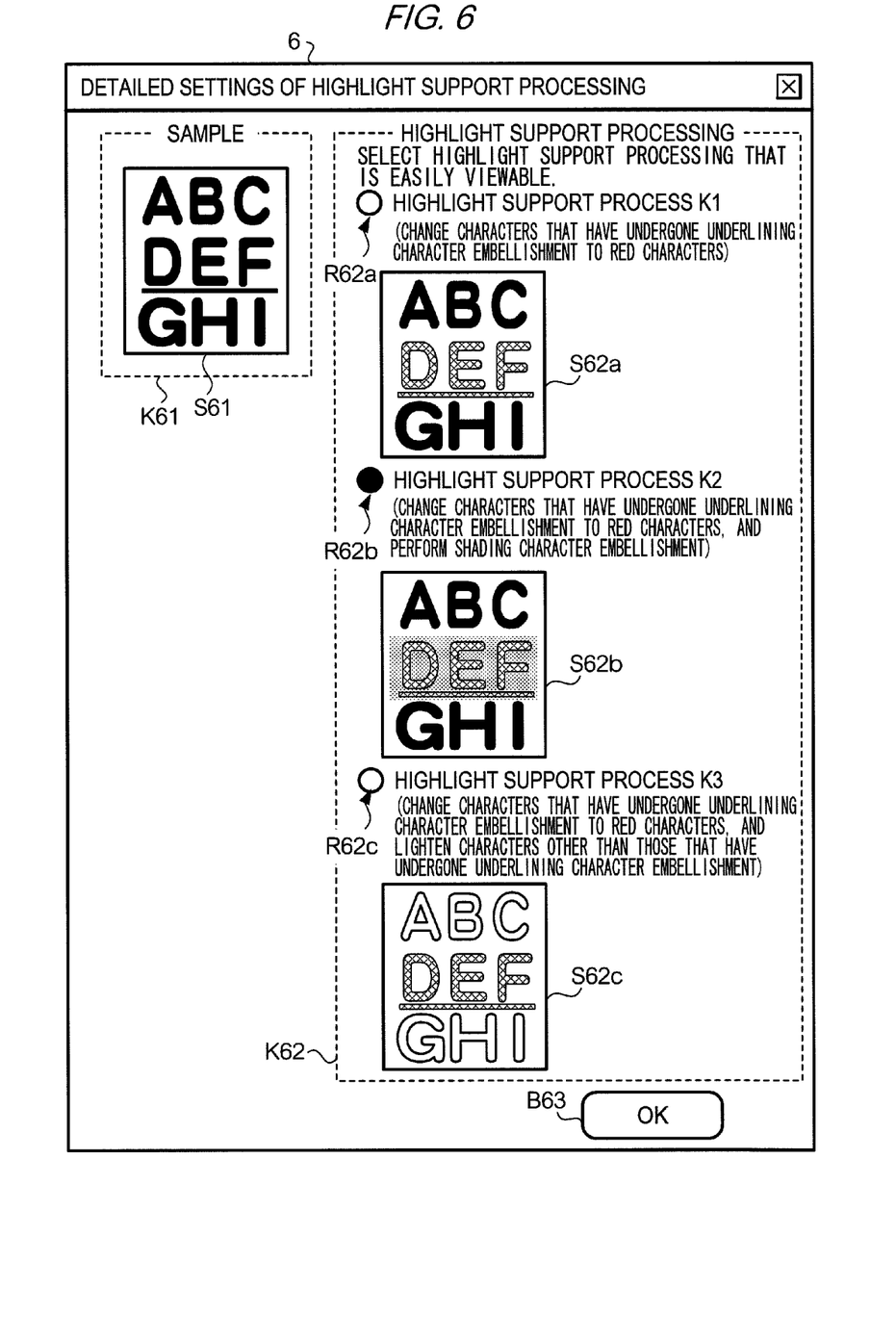
FIG. 6 shows a pop-up window 6 for setting the details of highlight support processing in the exemplary embodiment.

Assume that the user instructs the image forming apparatus 1b, which is color output compatible, to form an image. Then, the control unit 31, because of judging that the image forming apparatus 1b is color output compatible (YES at step S44), causes a pop-up window (for color output compatible usage) 6 that allows the user to set the details of the highlight support processing to be displayed (step S45). FIG. 6 shows the pop-up window 6.

A sample image S61 in which the characters "ABCDEFGHI" are drawn in black is displayed in a rectangular area K61 enclosed with a broken line on the pop-up window 6. While this sample image S61 may be an image represented by document image data created by the user or an image described as a sample in advance in the printer driver 322, examples of the latter are illustrated here. A rectangular area K62 enclosed by a broken line is divided for each of the processing modes of the highlight support processing, namely, "highlight support process K1", "highlight support process K2" and "highlight support process K3".

The "highlight support process K1" processing mode is processing corresponding to the abovementioned "a: converting a character that has undergone underlining character embellishment to a red character". A radio button R62a and a processed sample image S62a that results from processing corresponding to the highlight support process K1 processing mode having been performed on the sample image S61 are displayed in the area corresponding to the "highlight support process K1" processing mode. An image in which characters in the sample image S61 that have undergone underlining character embellishment have been changed to red, or in other words, an image in which it is clear that the characters "DEF" that have undergone underlining character embellishment are red characters is displayed as the processed sample image S62a. Note that with this processed sample image S62a, an image in which it is clear that the line segment image equivalent to the underlining character embellishment is itself a red character is also displayed, besides the characters that have undergone the underlining character embellishment. This is not essential, however, and at least an image in which it is clear that the characters "DEF" that have undergone underlining character embellishment have been changed to red characters need only be displayed.

Also, the "highlight support process K2" processing mode is processing corresponding to the abovementioned "a: converting a character that has undergone underlining character embellishment to a red character" and "b: performing shading character embellishment on a character that has undergone underlining character embellishment". A radio button R62b and a processed sample image S62b that results from processing corresponding to the highlight support process K2 processing mode having been performed on the sample image S61 are displayed in the area corresponding to the "highlight support process K2" processing mode. An image in which the characters in the sample image S61 that have undergone underlining character embellishment have been changed to red and have further undergone shading character embellishment, or in other words, an image in which it is clear that the characters "DEF" that have undergone underlining character embellishment have been changed to red characters and have also undergone shading character embellishment is displayed as the processed sample image S62b. Note that with this processed sample image S62b, an image in which it is clear that the line segment image equivalent to the underlining character embellishment is itself a red character is also displayed. This is not essential, however, and at least an image in which it is clear that the characters "DEF" that have undergone underlining character embellishment have been changed to red characters and have also undergone shading character embellishment need only be displayed.

Also, the "highlight support process K3" processing mode is processing corresponding to the abovementioned "a: converting a character that has undergone underlining character embellishment to a red character" and "c: lightening characters other than a character that has undergone underlining character embellishment." A radio button R62c and a processed sample image S62c that results from processing corresponding to the highlight support process K3 processing mode having been performed on the sample image S61 are displayed in the area corresponding to the "highlight support process K3" processing mode. An image in which the characters in the sample image S61 that have undergone underlining character embellishment have been changed to red and, further, characters other than the characters that have undergone underlining character embellishment have been lightened, or in other words, an image in which it is clear that the characters "DEF" that have undergone underlining character embellishment have been changed to red characters and also that the characters "ABCGHI" other than the characters that have undergone underlining character embellishment have been lightened is displayed. Note that with this processed sample image S62c, an image in which it is clear that the line segment image equivalent to the underlining character embellishment is itself a red character is also displayed, besides the characters that have undergone the underlining character embellishment. This is not essential, however, and at least an image in which it is clear that the characters "DEF" that have undergone underlining character embellishment have been changed to red characters, and also that the characters "ABCGHI" other than the characters that have undergone underlining character embellishment have been lightened need only be displayed.

Assume that the user then instructs highlight support processing of the content shown in FIG. 6, for example, by operating the operation unit 33, or in other words, selects the radio button R62b corresponding to the "highlight support process K2" processing mode, and further selects a soft button B63 inscribed with "OK" in a right edge corner portion of the window. Then, the control unit 31 generates document image data that visually highlights the characters that have undergone underlining character embellishment, by performing highlight support processing of selected content, with respect to the document image data (step S46). More specifically, the control unit 31 performs processing corresponding to the highlight support process K2 processing mode designated at the processing of step S45 on the characters that have undergone underlining character embellishment specified at the processing of step S41, or in other words, generates document image data in which the characters that have undergone underlining character embellishment have been changed to red, and have further undergone shading character embellishment. In other words, the control unit 31 is an example of a generating unit that generates image data that has undergone processing corresponding to the processing mode of the highlight support processing. The control unit 31 then performs image processing for converting the document image data resulting from the highlight support processing to image data expressed in a page description language that is processible by the image forming apparatus 1b (step S49). Next, the control unit 31 transmits the image data and an instruction for forming an image that depends on the image data to the image forming apparatus 1b from the communication unit 35 (step S50). That is, the control unit 31 is an example of an output unit that outputs image data to an image forming unit. The control unit 11 of the image forming apparatus 1b, on the communication unit 15 receiving the image data and the instruction from the information processing apparatus 3, converts this image data to bitmap data, and controls the image forming unit 17 to form an image on recording paper.

Figure 7:
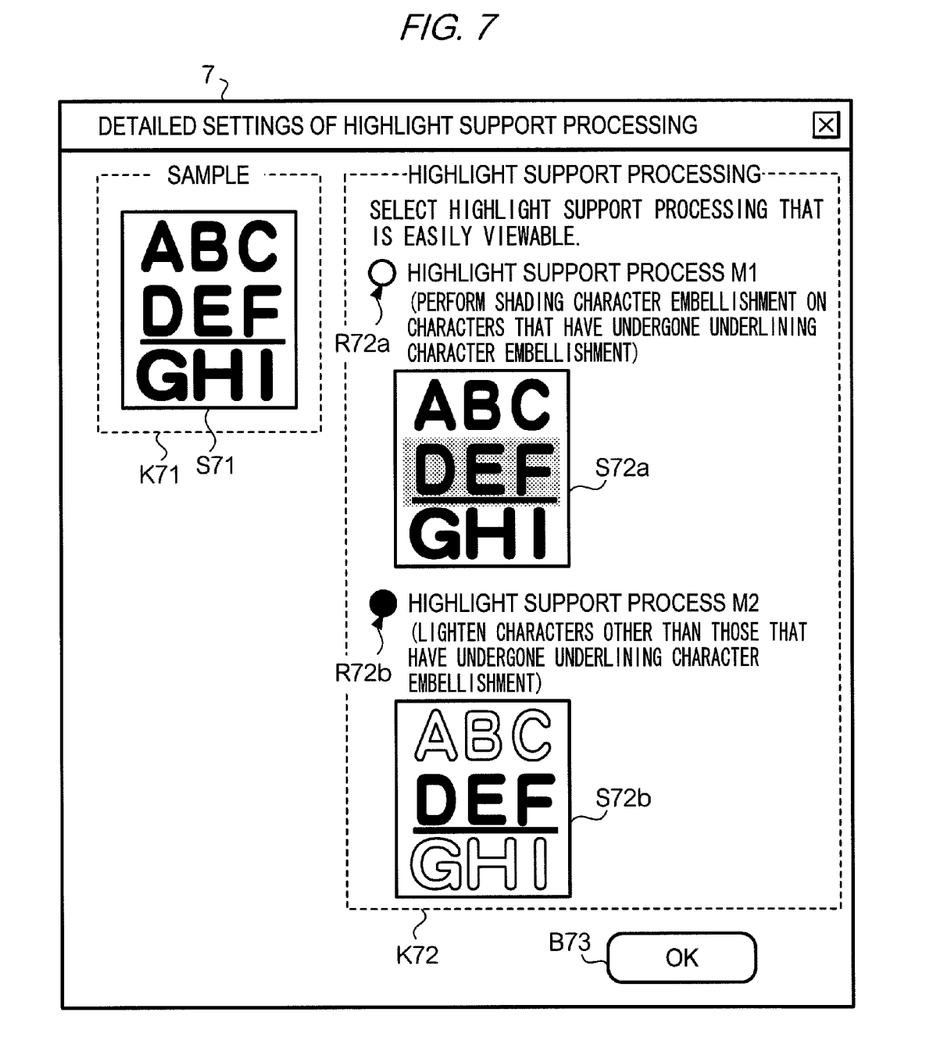
FIG. 7 shows a pop-up window 7 for setting the details of highlight support processing in the exemplary embodiment.

On the other hand, assume that the user instructs the image forming apparatus 1a, which is monochrome output compatible, to form an image. Then, the control unit 31, because of judging in step S44 that the image forming apparatus 1a is monochrome output compatible (NO at step S44), causes a pop-up window (for monochrome output compatible usage) 7 that allows the user to set the details of the highlight support processing to be displayed (step S47). FIG. 7 shows the pop-up window 7.

A sample image S71 in which the characters "ABCDEF-GHI" are drawn in black is displayed in a rectangular area K71 enclosed with a broken line on the pop-up window 7. While this sample image S71 may be an image represented by document image data created by the user or an image described as a sample in advance in the printer driver 322, examples of the latter are illustrated here. A rectangular area K72 enclosed by a broken line is divided for each of the processing modes of the highlight support processing, namely "highlight support process M1" and "highlight support process M2."

The "highlight support process M1" processing mode is processing corresponding to the abovementioned "b: performing shading character embellishment on a character that has undergone underlining character embellishment". A radio button R72a and a processed sample image S72a that results from processing corresponding to the highlight support process M1 processing mode having been performed on the sample image S71 are displayed in the area corresponding to the "highlight support process M1" processing mode. An image in which the characters in the sample image S71 that have undergone underlining character embellishment have undergone shading character embellishment, or in other words, an image in which it is clear that shading character embellishment has been performed on the characters "DEF" that have undergone underlining character embellishment is displayed as the processed sample image S72a.

Also, the "highlight support process M2" processing mode is processing corresponding to the abovementioned "c: lightening characters other than a character that has undergone underlining character embellishment." A radio button R72b and a processed sample image S72b that results from processing corresponding to the highlight support process M2 processing mode having been performed on the sample image S71 are displayed in the area corresponding to the "highlight support process M2" processing mode. An image in which characters other than the characters that have undergone underlining character embellishment in the sample image S71 have been lightened, or in other words, an image in which it is clear that the characters "ABCGHI" other than the characters that have undergone underlining character embellishment have been lightened is displayed as the processed sample image S72b.

Assume that the user instructs highlight support processing of the content shown in FIG. 7, by operating the operation unit 33, or in other words, selects the radio button R72b corresponding to the "highlight support process M2" processing mode, and further selects a soft button B73 inscribed with "OK" in a right edge corner portion of the window. Then, the control unit 31 generates document image data that visually highlights the characters that have undergone underlining character embellishment, by performing highlight support processing of selected content, with respect to the document image data (step S48). More specifically, the control unit 31 performs processing corresponding to the highlight support process M2 processing mode designated at step S47 on the characters that have undergone underlining character embellishment specified at the processing of step S41, that is, generates document image data in which characters other than the characters that have undergone underlining character embellishment have been lightened. In other words, the control unit 31 is an example of a generating unit that generates image data that has undergone processing corresponding to the processing mode of the highlight support processing. The control unit 31 then performs image processing for converting the document image data resulting from the highlight support processing to image data expressed in a page description language that is processible by the image forming apparatus 1a (step S49). Next, the control unit 31 transmits the image data and an instruction for forming an image that depends on the image data to the image forming apparatus 1a from the communication unit 35 (step S50). That is, the control unit 31 is an example of an output unit that outputs image data to an image forming unit. The control unit 11 of the image forming apparatus 1a, on the communication unit 15 receiving the image data and the instruction from the information processing apparatus 3, converts the image data to bitmap data, and controls the image forming unit 17 to form an image on recording paper.

Note that the control unit 31, in the case of judging in step S41 that a character that has undergone underlining character embellishment and is targeted for highlight support processing is not included (NO at step S41), skips the abovementioned processing of steps S42 to S48, and proceeds to the image processing of step S49. Also, if, in step S43, the "NO" radio button R52 is selected and the soft button B53 inscribed with "OK" in this window is further selected, by the operation unit 33 being operated by the user (NO at step S43), the control unit 31 skips the above-mentioned processing of steps S44 to S48, and proceeds to the image processing of step S49.

As described above, the information processing apparatus 3 interprets document image data, and judges whether characters that have undergone underlining character embellishment and are targeted for highlight support processing are included. Therefore, characters targeted for highlight support processing do not need to be registered beforehand, with respect to the characters of document image data.

Also, the user, by selecting the processing mode of the highlight support processing that he or she wants to perform on a document image, and causing the display 34 to display a processed sample image that is a result of highlight support processing having been further performed, is able to confirm the visually highlighted effect resulting from the highlight support processing before forming the document image on recording paper. Accordingly, the user is able to specify the processing mode with which a visually highlighted result is obtained, by visually checking processed sample images himself or herself.

Note that there exist conditions known in optometric terms as trichromacy (normal trichromatic vision), dichromacy (normal dichromatic vision) and anomalous trichromacy (anomalous trichromatic vision), depending on the presence or absence of red, green and blue cone cell defects. A person with dichromacy or anomalous trichromacy has different cone types and spectral sensitivity to a person with normal color vision, and is only able to discriminate colors based on differences in color saturation and brightness, because of a lack of the information for distinguishing the respective hues of colors such as red, yellow and blue. Because even such a person with dichromacy or anomalous trichromacy who has difficulty discriminating hues is able to perceive the difference in brightness with the background, in the case where at least processing such as shading character embellishment or lightening is performed on a document, discriminating between a character string targeted for highlighting and other character strings is easier than with a document that has only been highlighted by underlining character embellishment.

(3) Variations (i) Variation 1

In the above exemplary embodiment, highlight support processing is performed as a result of the control unit 31 of the information processing apparatus 3 executing the printer driver 322, but the agent that performs the highlight support processing and the program in which the procedures of the highlight support processing are written are not limited to these. The procedures of the highlight support processing may be written in a different program to the printer driver 322, such as, for example, a document creation application program stored by the information processing apparatus 3, or a computer program stored by the image forming apparatus 1. In the latter case, because the image forming apparatus 1 executes the highlight support processing, the highlight support processing can also be performed on image data representing an image read by the image reading unit 16, for example. Therefore, even when copying is performed, the viewer can be provided with a document that has been further visually highlighted over the visual highlighting resulting from only underlining character embellishment.

Also, rather than the highlight support processing being performed as a result of the control unit 31 of the information processing apparatus 3 executing a program constituting software, an analog circuit such as an ASIC (Application Specific Integrated Circuit) may perform the highlight support processing independently of a program.

(ii) Variation 2

In the exemplary embodiment, underlining character embellishment is illustrated as a modification for distinguishing characters targeted for highlighting from other characters, but the present invention is not limited to this, and any modification that does not use multiple colors is acceptable. For example, shading or increasing the thickness of line segment images constituting a character is acceptable. Even with these modifications, the control unit 31 need only interpret commands written in the document creation application program 321 and specify characters that have undergone the modification.

(iii) Variation 3

In the exemplary embodiment, shading character embellishment is character embellishment that involves disposing multiple halftone dot images at a preset interval within the rectangular area of a bounding rectangle of a character string composed of characters that have undergone underlining character embellishment. However, modification processing on characters that have undergone underlining character embellishment need only be processing that involves disposing images having a set pattern, within an area that includes characters that have undergone underlining character embellishment. The shading character embellishment of the exemplary embodiment is included in this modification processing. Here, the area that includes characters that have undergone underlining character embellishment may be the rectangular area of a bounding rectangle of the characters or character string, or may be a rectangular area that is larger than the bounding rectangle by a preset amount. Also, the shape is not limited to a rectangular shape constituted only of straight lines, but may be a shape constituted by curves, such as a shape in which portions equivalent to the apexes of a rectangle are curved. Also, this area, while desirably completely excluding characters other than the characters that have undergone underlining character embellishment, may include the characters before and after the characters that have undergone underlining character embellishment, provided the highlighted location can be approximately specified. Also, the set pattern may, for instance, be a pattern in which multiple line segment images extending in the same direction are disposed at a preset interval, or may be a pattern in which a rectangular area is filled with a grid image or multiple images having a preset pattern or shape, apart from the multiple halftone dot images disposed at a preset interval, illustrated in the exemplary embodiment. This image is, however, desirably an image having a pattern that does not overly interfere with reading the characters.

(iv) Variation 4

The processing referred to as "a: converting a character that has undergone underlining character embellishment to a red character" may involve changing a character that has undergone underlining character embellishment to a specific color other than red.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
an acquiring unit that acquires image data representing a document image that includes characters; wherein at least some of the characters included in the document image represented by the image data acquired by the acquiring unit have undergone modification in a vicinity thereof based on an operator instruction;
an extracting unit that extracts, from the acquired image data based on identification of the at least some of the characters in the document image that have undergone modification in the vicinity thereof based on the operator instruction, a character from among the at least some of the characters that has undergone a modification in a vicinity of the character for distinguishing the character from another character in the document image;
a processing unit that processes the image data by reducing a density of the character other than the extracted character below a density of the other character indicated by the acquired image data to visually highlight the extracted character relative to the other character, wherein a density of the extracted character is maintained; and
an output unit that outputs the image data processed by the processing unit to an image forming apparatus.

2. The image processing apparatus according to claim 1, wherein the image forming apparatus includes a first image forming apparatus that forms an image using a plurality of colors and a second image forming apparatus that forms an image using shades of a single color, and
the image processing apparatus further comprises a decision unit that decides on the first image forming apparatus or the second image forming apparatus as an output destination of the processed image data, based on the acquired image data.

3. A non-transitory computer readable medium that stores a computer program that causes a computer to execute:
acquiring image data representing a document image that includes characters, wherein at least some of the characters included in the document image represented by the acquired image data have undergone modification in a vicinity thereof based on an operator instruction;
extracting, from the acquired image data based on identification of the at least some of the characters in the document image that have undergone modification in the vicinity thereof based on the operator instruction, a character from among the at least some of the characters that has undergone a modification in a vicinity of the character for distinguishing the character from another character in the document image;
processing the image data by reducing a density of the character other than the extracted character below a density of the other character indicated by the acquired image data to visually highlight the extracted character relative to the other character, wherein a density of the extracted character is maintained; and
outputting the processed image data to an image forming apparatus.

4. The computer readable medium according to claim 3,
wherein the image forming apparatus is one of a first image forming apparatus that forms an image using a plurality of colors and a second image forming apparatus that forms an image using shades of a single color, and
the computer program further causes the computer to execute deciding on the first image forming apparatus or the second image forming apparatus as an output destination of the processed image data, based on the acquired image data.

5. A method for processing an image comprising:
acquiring image data representing a document image that includes characters, wherein at least some of the characters included in the document image represented by the acquired image data have undergone modification in a vicinity thereof based on an operator instruction;
extracting, from the acquired image data based on identification of the at least some of the characters in the document image that have undergone modification in the vicinity thereof based on the operator instruction, a character from among the at least some of the characters that has undergone a modification in a vicinity of the character for distinguishing the character from another character in the document image;
processing the image data by reducing a density of the character other than the extracted character below a density of the other character indicated by the acquired image data to visually highlight the extracted character relative to the other character, wherein a density of the extracted character is maintained; and
outputting the processed image data to an image forming apparatus.

* * * * *